United States Patent [19]

Neubauer et al.

[11] Patent Number: 4,677,469
[45] Date of Patent: Jun. 30, 1987

[54] METHOD OF AND MEANS FOR MEASURING PERFORMANCE OF AUTOMATIC TARGET RECOGNIZERS

[75] Inventors: John C. Neubauer; Gerald A. Rusche, both of Fairfax County, Va.

[73] Assignee: The United States of America as represented by the Secretary of the Army, Washington, D.C.

[21] Appl. No.: 878,899

[22] Filed: Jun. 26, 1986

[51] Int. Cl.$^4$ .............................................. H04N 7/18
[52] U.S. Cl. ..................................... 358/93; 358/107; 358/108; 358/109; 382/30; 382/31
[58] Field of Search ................. 358/93, 107, 108, 109, 358/125, 126; 382/30, 31, 33, 34

[56] References Cited

U.S. PATENT DOCUMENTS 3,947,833  3/1976  Eckstein, Jr. .................... 358/107
4,267,562  5/1981  Raimondi ......................... 358/109

Primary Examiner—James J. Groody
Assistant Examiner—Michael D. Parker
Attorney, Agent, or Firm—Max L. Harwell; Aubrey J. Dunn; Anthony T. Lane

[57] ABSTRACT

A method and apparatus for scoring the performance of a video automatic target recognizer (ATR). A video scene signal supplied to the ATR is subtracted from the ATR video output signal to yield a difference signal indicative of targets identified by the ATR. This difference signal is compared to a ground truth signal (this ground truth signal contains all the true targets in the scene) to yield a score of ATR performance.

2 Claims, 2 Drawing Figures

METHOD OF AND MEANS FOR MEASURING PERFORMANCE OF AUTOMATIC TARGET RECOGNIZERS

The invention described herein may be manufactured, used, and licensed by the U.S. Government for governmental purposes without the payment of any royalties thereon.

BACKGROUND OF THE INVENTION

This invention is in the field of testing systems, and is particularly concerned with testing of automatic target recognizers. Such recognizers are becoming common in military scene-monitoring systems such as televison and infrared viewers. The target recognizers may be used for monitoring scenes and thus relieving fatigue of human operators, or for training such operators. For whatever purpose such recognizers are used, a need has arisen for some means of rapidly evaluating their performance. The instant invention fulfills this need.

SUMMARY OF THE INVENTION

The invention is a method and apparatus for measuring the performance of an automatic target recognizer (ATR). A scene signal fed into the ATR and the output signal of the ATR are both fed into a subtractor. This subtractor yields a difference signal indicative of the targets identified by the ATR and is compared to a ground truth signal indicative of actual targets. The degree of correlation between the ground truth signal and the difference signal determines the performance score of the ATR.

DESCRIPTION OF PREFERRED EMBODIMENTS

Figure 1:
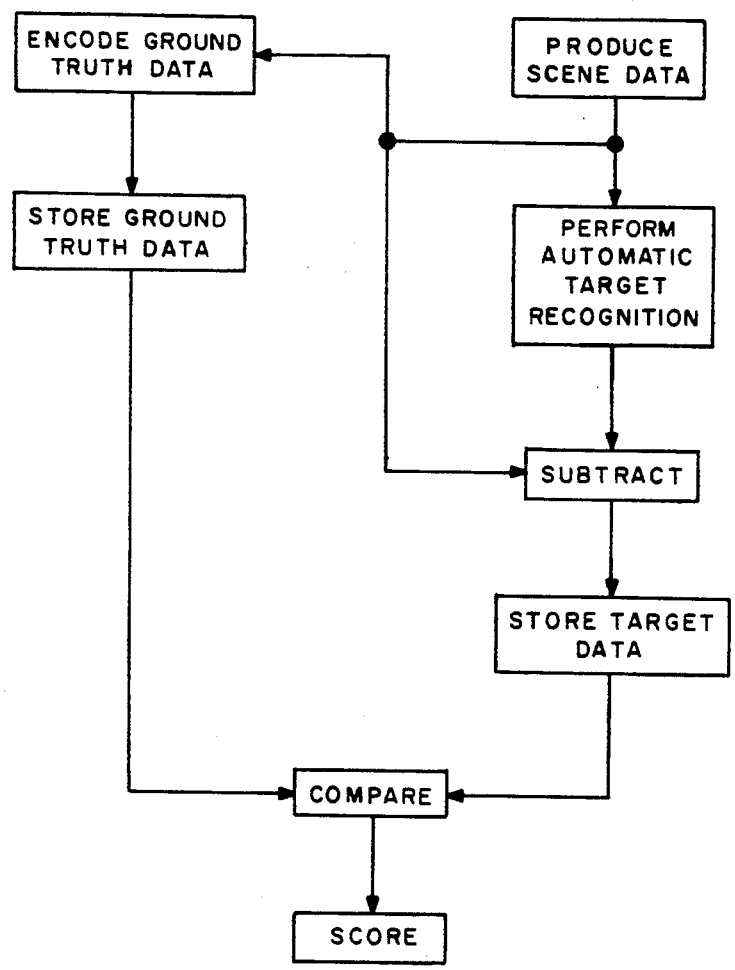
FIG. 1 is a flow chart for the method of the invention.

The invention might be best understood when this description is taken in conjunction with the drawings. In the flow chart of FIG. 1, the method begins with the step of producing a signal (analog or digital video) from a scene containing one or more targets. This signal is supplied to an ATR to be tested; the ATR produces an output signal, and this signal is subtracted from the scene signal to produce a signal related to target data only.

The target data signal is stored, and its use will be described below. Prior to the steps already described, it is necessary to establish a signal to which the target data signal may be compared. This is done by encoding and storing the ground truth data for the scene. Obviously, many techniques may be used for such encoding—for example, a cursor or light pen may be used to designate and/or annotate targets on a video terminal. Regardless of the method used, a video signal with such designation and/or annotations for ground truth is stored. The stored target data derived from the ART is compared with the ground truth data and the correspondence between these two data sets is directly related to the ART performance score. In the final step of the method, such a performance score is generated. In order to compare the data sets (which are in the form of video frames) it is obviously necessary that some type of frame identification of common time history be used. The SMPTE (Society of Motion Picture and Television Engineers) code is a common system which may be used. It should also be obvious that the ground truth data and the ART annotation be of the same format, in order for comparison to be made.

Figure 2:
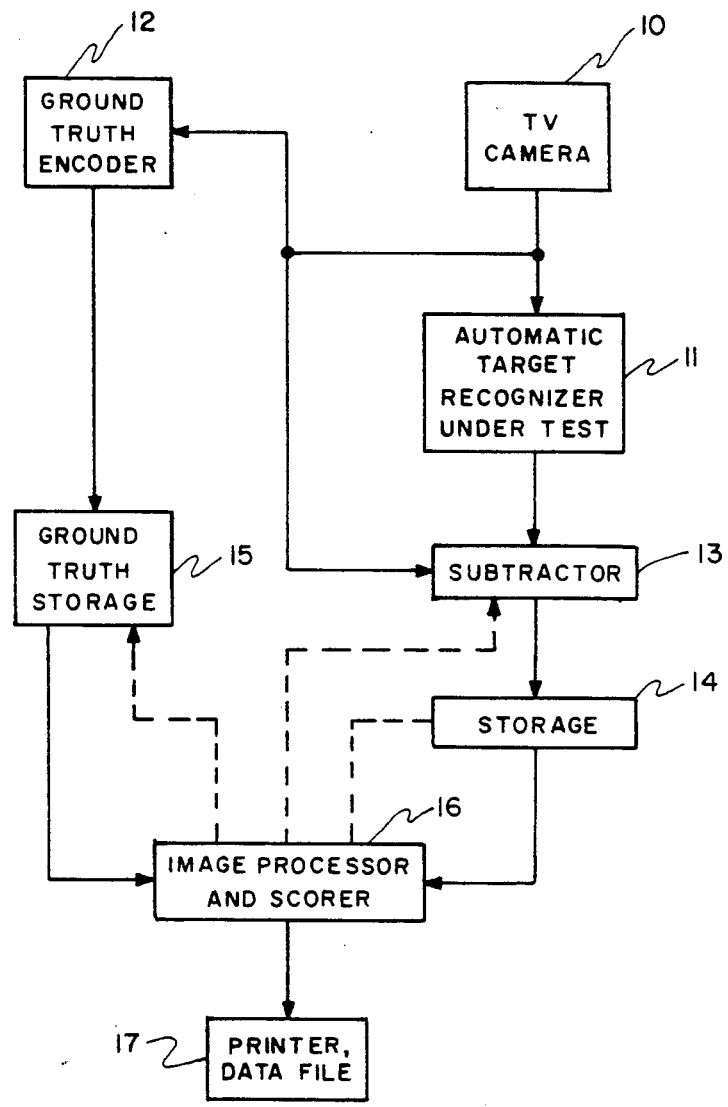
FIG. 2 is a schematic block diagram of the inventive apparatus.

A system capable of performing the method is shown in FIG. 2 and includes a television camera 10 which provides a video output signal for a scene of interest. This signal is applied to ATR 11 under test, to ground truth encoder 12, and to subtractor 13. The ATR may be any one of various types of such known devices; whatever its form, it provides a video output signal with designations/annotations at places on a video frame where it detects targets. The ATR ouput is fed into subtractor 13, which takes the algebraic difference signal and the TV camera output signal. This difference signal will be the target designations/annotations, and is stored in storage device 14 such as a video magnetic disc or tape.

The ground truth encoder 12 may take any one of several forms, and depending upon its form, may not require an input from camera 10. For example, an x-y encoder may be used to generate target information from a survey of a scene which the TV camera is observing. Probably the easiest way, in view of the current state of the art in video terminals, is a video terminal on which the target scene (as determined by the TV camera video output) is displayed. Targets in the scene may be appropriately designed or annotated (or both) using the video terminal keyboard and a light pen or cursor. As mentioned above, the designation/annotation must be of the same format as that provided by the ATR. A video output from 12, which contains the scene video plus target designation/annotation, is stored in storage device 15 such as a video magnetic disc or tape. Each frame stored in 15 and in 14 is supplied with a frame identification or common time history in order that corresponding frames may be simultaneously brought together in image processor and scorer 16. This processor/scorer also includes a computer capable of controlling all of 13, 14, and 15. Preferably, 16 is a Dual Plane Digital Image Processor such as the Quantex model QX-9220. Moreover, subtractor 13 may actually be a part of 16, or may be another QX-9220. Moreover, 14 and 15 may be video RAM's in 16. The output of 16 feeds a printer/data file 17.

Under control of 16, the following processing cycle is performed:
a. Frame #xxx from TV camera is loaded into plane A of subtractor 13.
b. Frame #xxx from ATR is loaded into plane B of subtractor 13 (it is assumed that 13 is a QX-9220).
c. The subtractor subtracts the image in plane A from the target annotated image in plane B to yield an image of annotation only.
d. Annotation image is loaded into video storage 14 (or video RAM of 16).
e. Image processor,
  1. Reads image in storage 14a RAM.
  2. Identifies characters.
  3. Identifies character location in image x-y space.
  4. Compares resulting data to data from #xxx in ground truth file of 15 or RAM.
  5. Decides hit, miss, or error.
  6. Outputs score to printer and data file.
f. Erases RAM and prepares for next frame.
We claim:

1. A systems for measuring the performance of an automatic target recognizer, wherein the targets are contained in a scene, including:
- means for producing a first video signal of the scene and supplying same to said automatic target recognizer, whereby said automatic target recognizer includes means for producing a target-annotated video output signal;
- means for producing a second video signal which is the difference between said first video signal and said target-annotated video signal;
- first and second video signal storage means, whereby said second video signal is stored in said first video signal storage means;
- means for producing a ground-truth video signal of said scene wherein this signal contains information as to all actual targets in said scene and whereby this signal is stored in said second video signal storage means;
- means for comparing the video signals contained in said first and second video signal storage means and for producing an output signal indicative of correspondence between these signals, and thus of the performance of said automatic target recognizer.

2. A method of measuring the performance of an automatic target recognizer, wherein said targets are contained in a scene, including the steps of:
- producing a first video signal of a scene and supplying same to said automatic target recognizer, whereby said automatic target recognizer produces a target-annotated video signal;
- producing a second video signal by taking the difference between said first video signal and said target-annotated signal;
- storing said second video signal:
- producing a ground-truth video signal of said scene wherein this signal contains information as to all actual targets in said scene;
- storing said ground-truth signal;
- comparing said stored second video and ground-truth signals for correspondence of information, and producing an output signal indicative of correspondence, whereby said output signal is indicative of the performance of said automatic target recognizer.

* * * * *